(12) United States Patent
Buszard et al.

(10) Patent No.: US 7,423,069 B2
(45) Date of Patent: Sep. 9, 2008

(54) BLENDS OF TETRAHALOPHTHALATE ESTERS AND PHOSPHORUS-CONTAINING FLAME RETARDANTS FOR POLYURETHANE COMPOSITIONS

(75) Inventors: David Buszard, Woodford (GB); Matthew D. Phillips, Camden, IN (US); Richard S. Rose, West Lafayette, IN (US); Stephen B. Falloon, Lafayette, IN (US)

(73) Assignee: Crompton Corporation, Middlebury, CT (US)

( * ) Notice: Subject to any disclaimer, the term of this patent is extended or adjusted under 35 U.S.C. 154(b) by 854 days.

(21) Appl. No.: 10/429,429

(22) Filed: May 5, 2003

(65) Prior Publication Data

US 2004/0030011 A1    Feb. 12, 2004

(51) Int. Cl.
  *C08G 18/06* (2006.01)
(52) U.S. Cl. .................. 521/106; 521/107; 521/108; 521/130; 521/170; 521/174
(58) Field of Classification Search ............... 521/106, 521/107, 108, 170, 174, 130
See application file for complete search history.

(56) References Cited

U.S. PATENT DOCUMENTS

| | | | |
|---|---|---|---|
| 4,246,360 A * | 1/1981 | Brown et al. | 521/102 |
| 4,407,891 A | 10/1983 | Ernsberger | |
| 4,407,981 A | 10/1983 | Aaronson | |
| 4,880,844 A | 11/1989 | Fesman | |
| 4,892,683 A | 1/1990 | Naseem | |
| 4,954,542 A * | 9/1990 | Bohen et al. | 524/89 |
| 5,036,121 A | 7/1991 | Coaker et al. | |
| 5,328,627 A | 7/1994 | Bohen et al. | |
| 5,728,760 A | 3/1998 | Rose et al. | |

FOREIGN PATENT DOCUMENTS

| | | |
|---|---|---|
| EP | 0 005 903 A2 | 12/1979 |
| EP | 0 005 903 B1 | 6/1983 |
| WO | WO 89/03854 A2 | 5/1989 |
| WO | WO98/57920 * | 12/1998 |
| WO | WO 99/31173 | 6/1999 |

OTHER PUBLICATIONS

International Search Report for International Application No. US03/13804 completed on Jul. 7, 2003.

* cited by examiner

*Primary Examiner*—John Cooney
(74) *Attorney, Agent, or Firm*—Jaimes Sher

(57) ABSTRACT

Flame retardant flexible polyurethane foam compositions, methods of flame retarding flexible polyurethane foam compositions, articles made therefrom and flame retardants that comprise blends of tetrahalophthalate esters and phosphorus-containing flame retardant having at least about 5 wt. % phosphorus additives. The combined weight of the tetrahalophthalate ester and the phosphorus-containing flame retardant comprises about 5 to about 20% by weight of the flexible polyurethane foam compositions or reaction mixtures. The ratio of the tetrahalophthalate ester to the phosphorus-containing flame retardant is from about 80:20 to about 20:80 percent by weight and preferably from about 60:40 to about 40:60 percent by weight.

39 Claims, No Drawings

BLENDS OF TETRAHALOPHTHALATE ESTERS AND PHOSPHORUS-CONTAINING FLAME RETARDANTS FOR POLYURETHANE COMPOSITIONS

TECHNICAL FIELD

The present invention relates to flame retardant polyurethane compositions, and more particularly to flame retardant flexible polyurethane foam compositions, methods of flame retarding flexible polyurethane foam compositions, articles made therefrom and flame retardants that comprise blends of tetrahalophthalate esters and phosphorus-containing flame retardant additives.

BACKGROUND ART

The production of materials based on polyurethane and other polymer systems derived from organic polyisocyanates is well established. Depending upon the formulations used in their manufacture, the products can vary in texture from the rubbery, elastomeric thermoplastic polyurethanes to the soft flexible foams used as cushioning materials to the rigid foams used as insulating or structural materials.

Flexible polyurethane foams are produced by reacting a polyol with a polyisocyanate in the presence of a foam-forming agent. Flexible polyurethane foams are used to make resilient structural materials such as cushioning or padding materials in the furniture and automotive industries. It is known to incorporate fire-retardant additives into such foam materials. However, care has to be taken so that adequate fire retardancy can be achieved without adversely affecting the desired physical properties of such foam materials.

Rigid polyurethane foams are produced by reacting a polyol with a polyisocyanate in the presence of blowing agents, surfactants and catalysts. Rigid polyurethane foams are typically used to in insulation applications, including insulation panels and light-weight laminated structural applications.

Blends of alkylated triphenyl phosphate with pentabromodiphenyl oxide have been used as flame retardants for flexible polyurethane foams and as flame retardant plasticizers in polyvinyl chloride (PVC) products. Due to environmental concerns, the use of pentabromodiphenyl oxide is being phased out of use, and alternative substitutes are being sought.

Dialkyltetrahalophthalate esters have been extensively researched. Di(2-ethylhexyl)tetrabromophthalate (DEHTBT) is a well known, commercially available flame retardant that is recommended for use in PVC, thermoplastic elastomers, and adhesives/coatings and is disclosed in International Publication No. WO 89/03854 to Pennwalt Corp.

The broad class of organophosphorus compounds, optionally halogenated, have long been used to reduce the flammability of substrates containing these materials. In particular, trialkyl phosphates, mixed alkylaryl phosphates, alkylated triaryl phosphates, and halohydrocarbyl phosphates are recognized flame retardant additives for a number of applications, including PVC and flexible polyurethane foams. Mixtures of different types of flame retardants are also known. Blends of alkyldiphenyl phosphate with DEHTBT are disclosed, and blends of alkylated triaryl phosphates with DEHTBT for use in PVC are suggested in U.S. Pat. No. 4,892,683 to Naseem and U.S. Pat. No. 5,036,121 to Coaker et al. Alkylated triaryl phosphate blends with DEHTBT as flame retardant hydraulic fluids are disclosed in U.S. Pat. No. 5,328,627 to Bohen et al.

The use of organophosphorus flame retardants, combined with halogenated flame retardants, in polyether flexible urethane foams are disclosed in U.S. Pat. No. 4,880,844 to Fesman. Similarly, U.S. Pat. No. 4,407,981 to Aaronson discusses the use of separate sources of organophosphorus and organohalogen flame retardants in polyurethanes and discloses the classes of "esters and imides of tetrabromophthalic anhydride" in a broad list of suitable organohalogen substances.

European Patent Application Publication No. 0 005 903 to Imperial Chemical Industries Ltd. discloses the use of dialkyl tetrabromophthalates with triaryl phosphates in rigid polyurea foams, with no suggestion of the applicability to flexible polyurethane foams.

U.S. Pat. No. 5,728,760 to Rose et al. describes a family of brominated benzoate esters that are especially suited to use in flexible polyurethane foams. A means of producing the esters is via decarboxylation of half esters made from tetrabromophthalate anhydride.

DISCLOSURE OF THE INVENTION

According to various features, characteristics and embodiments of the present invention which will become apparent as the description thereof proceeds, the present invention provides a flame retardant composition which includes a non-reactive dialkyl tetrahalophthalate ester, a phosphorus-containing flame retardant having at least about 5 wt. % phosphorus and a flexible polyurethane foam reaction mixture.

The present invention further provides a method of providing flame retarded flexible polyurethane compositions which involves including (calculated on weight of polyol) about 2 to about 20% by weight of a blend of a dialkyl tetrahalophthalate ester and a phosphorus-containing flame retardant having at least about 5 wt. % phosphorus as a component of a flexible polyurethane foam reaction mixture.

The present invention also provides a flexible polyurethane foam reaction mixture which includes a dialkyl tetrahalophthalate ester, a phosphorus-containing flame retardant having at least about 5 wt. % phosphorus, and a flexible polyurethane foam reaction mixture. According to the present invention, the combined weight of the dialkyl tetrahalophthalate ester and the phosphorus-containing flame retardant comprises about 5 to about 20% by weight of the polyol portion of the compositions to which they are added and the ratio of the dialkyl tetrahalophthalate ester to the phosphorus-containing flame retardant is from about 80:20 to about 20:80 percent by weight and preferably from about 60:40 to about 40:60 percent by weight.

The present invention is directed to flame retardant flexible polyurethane foam compositions, methods of flame retarding flexible polyurethane foam compositions, articles made therefrom and flame retardants that comprise blends of tetrahalophthalate esters and phosphorus-containing flame retardant additives.

The flame retardants provided according to the present invention for use in flexible polyurethane foam compositions comprise two components: (A) a dialkyl tetrahalophthalate ester; and (B) a phosphorous-containing flame retardant additive having at least about 5 wt. % phosphorus and optionally also having organically bound halogen.

The dialkyl tetrahalophthalate ester component generally useful for purposes of the present invention has the general structure:

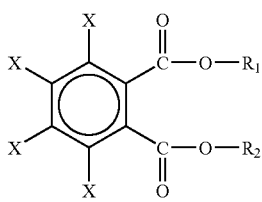

wherein $R_1$ and $R_2$ can be the same or different and represent a $C_1$ to $C_{20}$ linear, branched or cyclic alkyl group, and X is Cl or Br. In a preferred embodiment $R_1$ and $R_2$ are linear or branched $C_1$ to $C_{12}$ alkyl groups and X is Br. Di(2-ethylhexyl) tetrabromophthalate has been found to be particularly useful for purposes of the present invention.

The phosphorous-containing flame retardant additive used as component (B) can be any phosphorus-containing flame retardant additive that has at least about 5 wt. % phosphorus. It may optionally also have organically bound halogen, preferably chlorine or bromine. Compounds having less than about 5 wt. % phosphorus may also be used, but it has been determined that excessively high amounts of such compounds would be required to provide the desired levels of flame retardancy.

Suitable phosphorus sources include phosphates, phosphonates, phosphinates, phosphites and phosphine oxides. These may contain various alkyl, aryl, or alkaryl groups (optionally halogenated) provided that the size of the group does not cause the phosphorus content to be lower than about 5 wt. %. The phosphorous-containing flame retardant additive may be monomeric, dimeric or oligomeric.

Particularly suitable phosphorous-containing flame retardant additives include phosphates and phosphonates having one or two phosphorus atoms per molecule. Examples include: triethyl phosphate, tri-n-butyl phosphate, tri-isobutyl phosphate, tris(2-ethylhexyl) phosphate, dimethylmethyl phosphonate, resorcinol bis(diphenyl phosphate), dimethylpropyl phosphonate, triphenyl phosphate, and isodecyl diphenyl phosphate. Examples of halogenated phosphorus additives include tris(1,3-dichloro-2-propyl) phosphate also known as TDCP or Antiblaze® 195 (from Rhodia), and a chloroethyl diphosphate ester commercially available as Antiblaze 100 (from Rhodia).

More preferred phosphorous-containing flame retardant additives include (alkyl substituted) aryl phosphates having one or two (or mixtures of one or two) phosphorus atoms per molecule. Such phosphates are represented by the general formula:

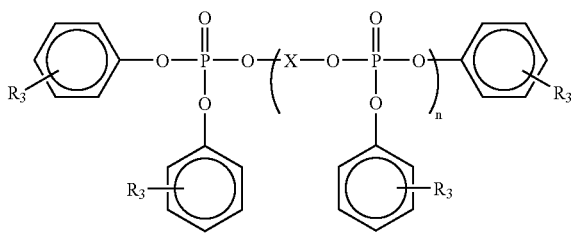

wherein each $R_3$ is independently either H or a linear or branched $C_1$ to $C_6$ alkyl group, X is a residue of an aromatic or aliphatic diol, and n is 0 or 1. Specific, non-limiting examples of the X precursor diol include resorcinol, catechol, neopentyl glycol, bisphenol-A and bisphenol-S.

Examples of specific (alkyl substituted) aryl phosphates include: neopentyl bis(diphenyl phosphate), tricresyl phosphate, bisphenol-A bis(diphenyl phosphate), butylated triphenyl phosphate, and isopropylated triphenyl phosphate.

(Alkyl substituted) aryl phosphates that are particularly suitable for purposes of the present invention include isopropylated triphenyl phosphates. It is to be understood that these include pure compounds such as 4-isopropylphenyl (diphenyl phosphate), as well as mixed triaryl phosphates in which the individual rings might contain 0, 1 or 2 isopropyl groups. In general, these alkylated triaryl phosphates will contain anywhere from about 9 wt. % phosphorus down to about 7 wt. % phosphorus depending on the degree of alkylation.

In the blends, components (A) and (B) are used in ratios that are readily determined to provide the best balance of properties. Such ratios are typically from about 80:20 to about 20:80 wt. %, and preferably about 60:40 to about 40:60 wt. %. The most preferred ratio is about 40 wt. % of the brominated dialkyl phthalate and about 60 wt. % of the phosphorus source.

In order to incorporate the blends of tetrahalophthalate esters and phosphorus-containing flame retardant additives into polyurethane foam compositions, the components (A) and (B) may be combined together such that (A) and (B) are provided as a single flame retardant package. Otherwise the components (A) and (B) may be added separately and individually to the other urethane foam reactants.

When used as a precombined package the overall blend of components (A) and (B) is typically used in an amount of from about 2 to about 20 wt. % when calculated on the weight of the polyol used in the formulations.

The flexible polyurethane foam compositions in which the blends of tetrahalophthalate esters and phosphorus-containing flame retardant additives are used according to the present invention include all well known, industrial compositions. Basically, flexible polyurethane foam compositions can be made according to the present invention by reacting an isocyanate with a polyol in the presence of a foam-forming agent and a blend of tetrahalophthalate esters and phosphorus-containing flame retardant additives.

The flame retardant flexible polyurethane foams of the present invention are useful as cushioning materials in home furnishing and automotive applications and other applications that typically involve the use of flexible foam materials.

Generally polyurethane examples were prepared according to the following procedure.

The specified fire retardant component is first combined with the polyol component. When the polyol component and fire retardant appear to be mixed, the remaining components of the formulations, except for the isocyanate, are added and mixed. When the composition appears to be mixed, isocyanate is added as the last component and mixed until the mixture appears homogeneous. Unless otherwise indicated measurement units are by weight.

The reaction mixture is poured into a box and allowed to expand fully. The box containing expanded foam is placed in a ventilated 110° C. oven for 30 minutes to accelerate curing. Foam samples are removed from their boxes and stored under ambient conditions for at least twenty four hours prior to testing.

EXAMPLES 1-8

The formulations of the foam yield a polyurethane composition having a density of 22.7 kg/m$^3$ (1.5 lb/ft$^3$) according to Table 1. The measurement 'Index' is a measure of the quantity of reactant required to react stoichiometrically with the sum of all hydroxyl moities present in the reaction mixture from the polyol and water. A 100 index represents 1:1 stoichiometry. A 110 index represents a ten percent excess of reactant for the sum of hydroxyls present.

TABLE 1

| Polyurethane Component | Parts per Hundred Parts Polyol (php) |
|---|---|
| conventional polyether polyol prepared from polyethylene oxide having a hydroxyl number of 56 and a molecular weight of 3000 | 100 |
| water | 4.4 |
| Dabco 8264 amine catalyst from Air Products & Chemicals Inc. 7201 Hamilton Boulevard, Allentown, PA 18195 United States. | 0.48 |
| Osi L-620 silicone surfactant a polyalkalene oxide - methyl siloxane co-polymer Crompton Corporation, One American Lane, Greenwich, CT, 06831, United States | 1.0 |
| stannous octoate catalyst | 0.29 |
| toluene diisocyanate | 110 index |

Various fire retardant components are added to the foam composition of Table 1. The fire retardants are evaluated to determine a loading level required to meet or exceed the standard of Federal Motor Vehicle Safety Standard No. 302, Published in the United States Code of Federal Regulations, 49 CFR section 571.302 (FMVSS-302)—Flammability of interior materials; and the test standard published by the State of California, Department of Consumer Affairs, Bureau of Home Furnishings and Thermal Insulation Technical Information Bulletin 117.

For the fire retardants tested according to the test methods Table 2 sets forth the level of fire retardant required to achieve the fire retardant standards of the tests for the polyurethane foam of Table 1.

TABLE 2

| Example | Fire Retardant | California 117 Test (php) | MVSS-302 Loading (php) |
|---|---|---|---|
| 1* | a blend of 3 part of pentabromodiphenyl-oxide and 1 part triisopropylated arylphosphate | 15 | 14 |
| 2* | a blend of 1 part benzoate of tetrabromo phthalic anhydride and 1 part triisopropylated arylphosphate | 15 | 14 |
| 3* | tris dichloropropyl phosphate | 14 | 13 |
| 4 | a blend 4 parts 2-ethylhexylphthalate of tetrabromophthalic anhydride and 6 parts triisopropylated arylphosphate | 15 | 14 |
| 5 | a blend of 4 parts 2-ethylhexylphthalate of tetrabromophthalic anhydride and 6 parts resorcinol diphosphate | 17 | 16 |
| 6 | a blend of 4 parts 2-ethylhexylphthalate of tetrabromophthalic anhydride and 6 parts chloroethyl phosphate | 15 | 14 |
| 7 | a blend of 4 parts 2-ethylhexylphthalate of tetrabromophthalic anhydride and 6 parts tris dichloropropyl phosphate | 14 | 13 |
| 8 | a blend of 4 parts 2-ethylhexylphthalate of tetrabromophthalic anhydride and 6 parts phosphoric acid, 2,2-bis(chloromethyl)-1,3-propanediyltetrakis(2-chloroethyl)ester. | 14 | 14 |

*comparative example

EXAMPLES 9-16

The formulations of the foam yield a polyurethane composition having a density of 27.3 kg/m$^3$ (1.8 lb/ft$^3$) according to Table 3.

TABLE 3

| Polyurethane component | parts per hundred parts polyol (php) |
|---|---|
| conventional polyether polyol prepared from polyethylene oxide having a hydroxyl number of 56 and a molecular weight of 3000 | 100 |
| water | 3.4 |
| Dabco 8264 amine catalyst | 0.48 |
| Osi L-620 silicone surfactant | 1.0 |
| stannous octoate catalyst | 0.28 |
| toluene diisocyanate | 110 index |

For the fire retardants tested according to the test method, Table 4 sets forth the level of fire retardant required to achieve-the fire retardant standards of the FMVSS-302 test for the polyurethane foam of Table 3.

TABLE 4

| Example | Fire Retardant | MVSS-302 Load Level (php) |
|---|---|---|
| 9* | a blend of 3 part of pentabromodiphenyl-oxide and 1 part triisopropylated arylphosphate | 4 |
| 10* | a blend of 1 part benzoate of tetrabromo phthalic anhydride and 1 part triisopropylated arylphosphate | 4 |
| 11* | tris dichloropropyl phosphate | 4 |
| 12 | a blend 4 parts 2-ethylhexylphthalate of tetrabromophthalic anhydride and 6 parts triisopropylated arylphosphate | 4 |
| 13 | a blend of 4 parts 2-ethylhexylphthalate of tetrabromophthalic anhydride and 6 parts resorcinol diphosphate | 5 |
| 14 | a blend of 4 parts 2-ethylhexylphthalate of tetrabromophthalic anhydride and 6 parts tris chloroethyl phosphate | 4 |
| 15 | a blend of 4 parts 2-ethylhexylphthalate of tetrabromophthalic anhydride and 6 parts tris dichloropropyl phosphate | 4 |
| 16 | a blend of 4 parts 2-ethylhexylphthalate of tetrabromophthalic anhydride and 6 parts phosphoric acid, 2,2-bis(chloromethyl)-1,3-propanediyltetrakis(2-chloroethyl)ester. | 4 |

*comparative example

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above.

The foregoing examples demonstrate that commercial fire retardant standards can be achieved in flexible polyurethane foams without the need the use of pentabromodiphenyloxide. Rather, at comparable loading levels, blended fire retardants including tetrahalophthalate esters and phosphorus-containing flame retardant additives provide comparable, if not improved fire retardant properties.

What is claimed is:

1. A reaction mixture for the preparation of flame retardant flexible polyurethane foam comprising:
    a dialkyl tetrahalophthalate ester;
    a phosphorus-containing flame retardant having at least about 5 wt. % phosphorus.

2. A flame retardant composition according to claim 1, wherein the combined weight of the dialkyl tetrahalophthalate ester and the phosphorus-containing flame retardant comprises about 5 to about 20% by weight of the polyol portion of the composition.

3. A flame retardant composition according to claim 2, wherein the ratio of the dialkyl tetrahalophthalate ester to the phosphorus-containing flame retardant is from about 80:20 to about 20:80 percent by weight.

4. A flame retardant composition according to claim 3, wherein the ratio of the dialkyl tetrahalophthalate ester to the phosphorus-containing flame retardant is from about 60:40 to about 40:60 percent by weight.

5. A flame retardant composition according to claim 1, wherein the dialkyl tetrahalophthalate ester has the general formula:

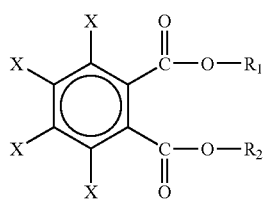

wherein $R_1$ and $R_2$ can be the same or different and represent a $C_1$ to $C_{20}$ linear, branched or cyclic alkyl group, and X is Cl or Br.

6. A flame retardant composition according to claim 5, wherein $R_1$ and $R_2$ are linear or branched $C_1$ to $C_{12}$ alkyl groups and X is Br.

7. A flame retardant composition according to claim 6, wherein the dialkyl tetrahalophthalate ester comprises di(2-ethylhexyl)tetrabromophthalate.

8. A flame retardant composition according to claim 1, wherein the phosphorus-containing flame retardant comprises at least one of a phosphate, a phosphonate, a phosphinate, a phosphite and a phosphine oxide.

9. A flame retardant composition according to claim 8, wherein the phosphorus-containing flame retardant comprises at least one of triethyl phosphate, tri-n-butyl phosphate, tri-isobutyl phosphate, tris(2-ethylhexyl) phosphate, dimethylmethyl phosphonate, resorcinol bis (diphenyl phosphate), dimethylpropyl phosphonate, triphenyl phosphate, and isodecyl diphenyl phosphate.

10. A flame retardant composition according to claim 8, wherein the phosphorus-containing flame retardant has the general formula:

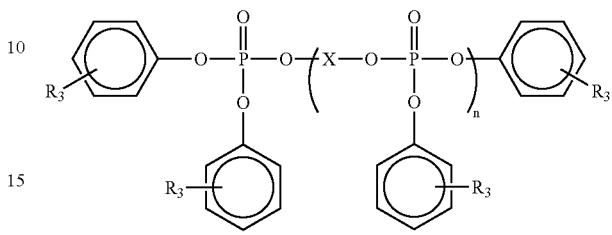

wherein each $R_3$ is independently either H or a linear or branched $C_1$ to $C_6$ alkyl group, X is a residue of an aromatic or aliphatic diol, and n is 0 or 1.

11. A flame retardant composition according to claim 10, wherein the phosphorus-containing flame retardant comprises at least one of a neopentyl bis(diphenyl phosphate), a tricresyl phosphate, a bisphenol-A bis(diphenyl phosphate), a butylated triphenyl phosphate, and an isopropylated triphenyl phosphate.

12. A flame retardant composition according to claim 11, wherein the phosphorus-containing flame retardant comprises an isopropylated triphenyl phosphate.

13. A flexible foamed article made from the flame retardant composition of claim 1.

14. A method of providing flame retarded flexible polyurethane compositions which comprises including about 2 to about 20% by weight of polyol of a blend of a dialkyl tetrahalophthalate ester and a phosphorus-containing flame retardant having at least about 5 wt. % phosphorus as a component of a flexible polyurethane foam reaction mixture.

15. A method of providing flame retarded flexible polyurethane compositions according to claim 14, wherein the dialkyl tetrahalophthalate ester and a phosphorus-containing flame retardant are preblended together before being added to the flexible polyurethane foam reaction mixture.

16. A method of providing flame retarded flexible polyurethane compositions according to claim 14, wherein the ratio of the dialkyl tetrahalophthalate ester to the phosphorus-containing flame retardant is from about 80:20 to about 20:80 percent by weight.

17. A method of providing flame retarded flexible polyurethane compositions according to claim 16, wherein the ratio of the dialkyl tetrahalophthalate ester to the phosphorus-containing flame retardant is from about 60:40 to about 40:60 percent by weight.

18. A method of providing flame retarded flexible polyurethane compositions according to claim 14, wherein the dialkyl tetrahalophthalate ester has the general formula:

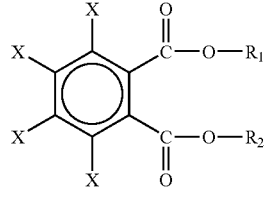

wherein $R_1$ and $R_2$ can be the same or different and represent a $C_1$ to $C_{20}$ linear, branched or cyclic alkyl group, and X is Cl or Br.

19. A method of providing flame retarded flexible polyurethane compositions according to claim 18, wherein $R_1$ and $R_2$ are linear or branched $C_1$ to $C_{12}$ alkyl groups, and X is Br.

20. A method of providing flame retarded flexible polyurethane compositions according to claim 19, wherein the dialkyl tetrahalophthalate ester comprises di(2-ethylhexyl) tetrabromophthalate.

21. A method of providing flame retarded flexible polyurethane compositions according to claim 14, wherein the phosphorus-containing flame retardant comprises at least one of a phosphate, a phosphonate, a phosphinate, a phosphite and a phosphine oxide.

22. A method of providing flame retarded flexible polyurethane compositions according to claim 21, wherein the phosphorus-containing flame retardant comprises at least one of triethyl phosphate, tri-n-butyl phosphate, tri-isobutyl phosphate, tris(2-ethylhexyl) phosphate, dimethylmethyl phosphonate, resorcinol bis (diphenyl phosphate), dimethylpropyl phosphonate, triphenyl phosphate, and isodecyl diphenyl phosphate.

23. A method of providing flame retarded flexible polyurethane compositions according to claim 21, wherein the phosphorus-containing flame retardant has the general formula:

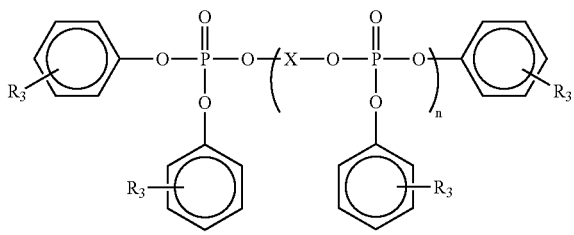

wherein each $R_3$ is independently either H or a linear or branched $C_1$ to $C_6$ alkyl group, X is a residue of an aromatic or aliphatic diol, and n is 0 or 1.

24. A method of providing flame retarded flexible polyurethane compositions according to claim 23, wherein the phosphorus-containing flame retardant comprises at least one a neopentyl bis(diphenyl phosphate), a tricresyl phosphate, a bisphenol-A bis(diphenyl phosphate), a butylated triphenyl phosphate, and an isopropylated triphenyl phosphate.

25. A method of providing flame retarded flexible polyurethane compositions according to claim 24, wherein the phosphorus-containing flame retardant comprises an isopropylated triphenyl phosphate.

26. A flexible foamed article made from the flame retardant composition of claim 14.

27. A flexible polyurethane foam reaction mixture which comprises;
  a dialkyl tetrahalophthalate ester;
  a phosphorus-containing flame retardant having at least about 5 wt. % phosphorus; and
  a flexible polyurethane foam reaction mixture.

28. A flexible polyurethane foam reaction mixture according to claim 27, wherein the combined weight of the dialkyl tetrahalophthalate ester and the phosphorus-containing flame retardant comprises about 5 to about 20 % by weight of the polyol part of the composition.

29. A flexible polyurethane foam reaction mixture according to claim 28, wherein the ratio of the dialkyl tetrahalophthalate ester to the phosphorus-containing flame retardant is from about 80:20 to about 20:80 percent by weight.

30. A flexible polyurethane foam reaction mixture according to claim 29, wherein the ratio of the dialkyl tetrahalophthalate ester to the phosphorus-containing flame retardant is from about 60:40 to about 40:60 percent by weight.

31. A flexible polyurethane foam reaction mixture according to claim 27, wherein the dialkyl tetrahalophthalate ester has the general formula:

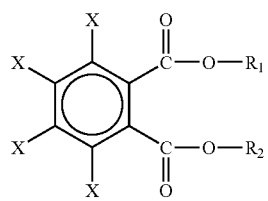

wherein $R_1$ and $R_2$ can be the same or different and represent a $C_1$ to $C_{20}$ linear, branched or cyclic alkyl group, and X is Cl or Br.

32. A flexible polyurethane foam reaction mixture according to claim 31, wherein $R_1$ and $R_2$ are linear or branched $C_1$ to $C_{12}$ alkyl groups and X is Br.

33. A flexible polyurethane foam reaction mixture according to claim 32, wherein the dialkyl tetrahalophthalate ester comprises di(2-ethylhexyl)tetrabromophthalate.

34. A flexible polyurethane foam reaction mixture according to claim 27, wherein the phosphorus-containing flame retardant comprises at least one of a phosphate, a phosphonate, a phosphinate, a phosphite and a phosphine oxide.

35. A flexible polyurethane foam reaction mixture according to claim 34, wherein the phosphorus-containing flame retardant comprises at least one of triethyl phosphate, tri-n-butyl phosphate, tri-isobutyl phosphate, tris(2-ethylhexyl) phosphate, dimethylmethyl phosphonate, resorcinol bis (diphenyl phosphate), dimethylpropyl phosphonate, triphenyl phosphate, and isodecyl diphenyl phosphate.

36. A flexible polyurethane foam reaction mixture according to claim 34, wherein the phosphorus-containing flame retardant has the general formula:

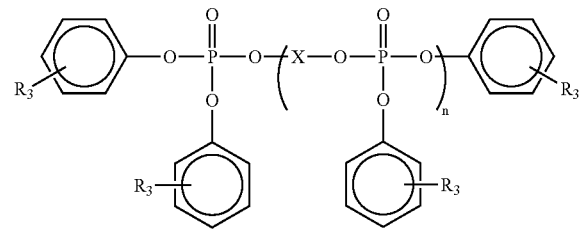

wherein each $R_3$ is independently either H or a linear or branched $C_1$ to $C_6$ alkyl group, X is a residue of an aromatic or aliphatic diol, and n is 0 or 1.

37. A flexible polyurethane foam reaction mixture according to claim 36, wherein the phosphorus-containing flame retardant comprises at least one of a neopentyl bis(diphenyl phosphate), a tricresyl phosphate, a bisphenol-A bis(diphenyl phosphate), a butylated triphenyl phosphate, and an isopropylated triphenyl phosphate.

38. A flexible polyurethane foam reaction mixture according to claim 37, wherein the phosphorus-containing flame retardant comprises an isopropylated triphenyl phosphate.

39. A flexible foamed article made from the flame retardant composition of claim 27.

* * * * *